(12) United States Patent
Yoon

(10) Patent No.: US 8,141,213 B2
(45) Date of Patent: Mar. 27, 2012

(54) BELT TYPE CLAMP

(76) Inventor: Seong Hwan Yoon, Gyeonggi-do (KR)

( * ) Notice: Subject to any disclaimer, the term of this patent is extended or adjusted under 35 U.S.C. 154(b) by 447 days.

(21) Appl. No.: 12/538,550

(22) Filed: Aug. 10, 2009

(65) Prior Publication Data

US 2010/0154177 A1   Jun. 24, 2010

(30) Foreign Application Priority Data

Dec. 18, 2008   (KR) .................. 10-2008-0129207

(51) Int. Cl.
*F16L 33/08* (2006.01)
*F16L 33/02* (2006.01)
(52) U.S. Cl. ..................... 24/274 R; 24/279
(58) Field of Classification Search ............. 24/274 R, 24/279
See application file for complete search history.

(56) References Cited

U.S. PATENT DOCUMENTS

| | | | | |
|---|---|---|---|---|
| 2,189,172 A * | 2/1940 | Hathorn | ..................... | 24/274 R |
| 2,268,211 A * | 12/1941 | Hathorn | ..................... | 24/274 R |
| 2,381,349 A * | 8/1945 | Hagen et al. | ..................... | 24/271 |
| 3,087,220 A * | 4/1963 | Tinsley | ..................... | 24/274 R |
| 3,146,507 A * | 9/1964 | Tinsley | ..................... | 24/274 R |
| 3,175,271 A * | 3/1965 | Schukraft | ..................... | 24/274 R |
| 3,189,968 A * | 6/1965 | Henning | ..................... | 24/274 R |
| 3,561,078 A * | 2/1971 | Care | ..................... | 24/274 R |
| 3,605,213 A * | 9/1971 | Turner | ..................... | 24/274 R |
| 3,757,394 A * | 9/1973 | Turner | ..................... | 24/281 |
| 4,308,648 A * | 1/1982 | Fay | ..................... | 24/274 R |
| 4,445,254 A * | 5/1984 | Allert | ..................... | 24/274 R |
| 5,063,642 A | 11/1991 | Toth | | |
| 5,729,873 A | 3/1998 | Miley | | |
| 5,909,852 A * | 6/1999 | Allert | ..................... | 24/279 |

* cited by examiner

*Primary Examiner* — Robert J. Sandy
(74) *Attorney, Agent, or Firm* — WRB IP LLP

(57) ABSTRACT

A belt type clamp is provided which rapidly achieves a coupling operation of a band by snap connection between snap protrusions and snap depressions to prevent assembly defects and maximize workability.

4 Claims, 17 Drawing Sheets

BELT TYPE CLAMP

BACKGROUND AND SUMMARY

The present invention relates to a belt type clamp, and more particularly to a belt type clamp, which rapidly achieves a coupling operation of a band by snap connection between snap protrusions and snap depressions to prevent assembly defects and maximize workability.

In general, a duct or a hose is installed in order to discharge indoor air to the outside or guide exhaust gas or dust of a factory to the outside. Such a duct or a hose is coupled with another duct or hose with a belt type clamp to be extended in length, or is connected to another duct or hose, which is bent at an angle differing from that of the former, to change an air channel.

Korean Patent Registration No. 0658542 disclosing a belt type hose band (hereinafter, referred to as the conventional belt type hose band), which is another name for the belt type clamp, was published on Dec. 19, 2006. Such a conventional belt type hose band disclosed in the above Patent will be described as follows (here, respective elements will be denoted by terms and reference numerals defined taking into consideration the functions obtained in accordance with the present invention).

FIGS. 1a to 1c are perspective views illustrating an assembly process of the conventional belt type hose band.

As shown in FIGS. 1a to 1c, the conventional belt type hose band includes a band 10, a body 20, a rotating unit 30, and a locking bolt 40.

The band 10 is made of stainless steel, which is incorrodible, and is provided with saw-toothed grooves 11 formed on the surface thereof.

The body 20 includes side plates 22 extended upward from both sides of a base 21, which receives one end of the band 10 to be in surface contact with the end of the band 10 and is connected with the end of the band by spot-welding, and respectively provided with inclined lines 23 inclined to the other end of the band 10 and inclined long holes 24 being opposite to each other.

The rotating unit 30 includes a rotary shaft 33 extended upward from one end of a rotation plate 31 covering an upper portion of a space between the side plates 22 of the body 20 and provided with a first shaft hole 32 formed thereon and both ends extended to both sides and respectively inserted into the inclined long holes 24, protrusions 35 extended upward form the other end of the rotation plate 31, provided with a second shaft hole 34 formed therebetween, and respectively fixed to the inclined lines 23, and stoppers 36 extended upward from both sides of the rotation plate 31 and respectively surrounding the side plates 22.

The locking bolt 40 is inserted into the first shaft hole 32 and the second shaft 34 and thus is rotated at its present position, and is provided with a screw thread 41 engaged with the saw-toothed grooves 11 of the band 10.

Now, a process of assembling the band 10, the body 20, the rotating unit 30, and the locking bolt 40 will be described with reference to FIGS. 1a to 1c. As shown in FIGS. 1a to 1c, one end of the band 10 provided with the saw-toothed grooves 11 is inserted into the body 20 such that the end of the band 10 is in surface contact with the base 21 of the body 20, and then the end of the band 10 is connected to the base 21 of the body 20 by spot-welding. Thereafter, the locking bolt 40 is inserted into the first shaft hole 32 and the second shaft hole 34 of the rotating unit 30 such that the locking bolt 40 in the first shaft hole 32 and the second shaft hole 34 is rotated at its present position, and then both ends of the rotary shaft 33 of the rotating unit 30 are inserted into the body 20, i.e., the inclined long holes 24 of the side plates 22. Thereby, the assembly of the conventional belt type hose band is completed.

Hereinafter, a coupling process of the conventional belt type hose band will be described with reference to FIGS. 2a to 2d.

FIGS. 2a to 2d are perspective views illustrating the coupling process of the conventional belt type hose band.

Under the condition that both ends of the rotary shaft 33 of the rotating unit 30 are inserted into the inclined long holes 24 of the body 20, as shown in FIG. 2a, the rotating unit 30 with the locking bolt 40 is erected at an angle of 90° so as to secure a gap between the rotation plate 31 and the end of the band 10, as shown in FIG. 2b. Thereafter, the other end of the band 10 encircles, for example, outer circumferential surfaces of ducts (not shown), and then is inserted into the gap between the rotation plate 31 and the end of the band 10.

Thereafter, as shown in FIG. 2c, the rotating unit 30, into which the locking bolt 40 is inserted, is further rotated, i.e., is rotated about the rotary shaft 33 by an angle of 180°, thereby engaging the screw thread 41 of the locking bolt 40 with the saw-toothed grooves 11 of the band 10.

Thereafter, as shown in FIG. 2d, the locking bolt 40 is rotated at its present position by a driver (electric driver) D such that the screw thread 41 is rotated while engaging the screw thread 41 with the saw-toothed grooves 11 to draw the other end of the band 10 to the end of the band 10, thereby tightening the ducts.

During the process of drawing the other end of the band 10 to the end of the band 10, the protrusions 35 of the rotating unit 30 slide along the inclined lines 23 of the body 20 and thus the screw thread 41 of the locking bolt 40 located between the body 20 and the rotation plate 31 is fixed to the saw-toothed grooves 11 of the band 10, thereby achieving the assembly of the band 10, the body 20, the rotating unit 30, and the locking bolt 40.

FIGS. 3a to 3c are perspective views illustrating problems generated during the coupling process of the conventional belt type hose band.

In the conventional belt type hose band, under the condition that both ends of the rotary shaft 33 of the rotating unit 30 are inserted into the inclined long holes 24 of the body 20, as shown in FIG. 3a, the rotating unit 30 with the locking bolt 40 is erected at an angle of 90° so as to secure the gap between the rotation plate 31 and one end of the band 10, as shown in FIG. 3b. Thereafter, the other end of the band 10 encircles, for example, outer circumferential surfaces of ducts (not shown), and then is inserted into the gap between the rotation plate 31 and the end of the band 10. Thereafter, as shown in FIG. 3c, the rotating unit 30, into which the locking bolt 40 is inserted, is rotated by an angle of 180°, thereby engaging the screw thread 41 of the locking bolt 40 with the saw-toothed grooves 11 of the band 10. In this case, since a force of spreading the band 10 due to the elasticity of the band 10 made of stainless steel occurs, although the locking bolt 40 is rotated by the electric driver D, the screw thread 41 is not engaged with the saw-toothed grooves 11 and comes off the saw-toothed grooves 11, and the protrusions 35 do not slide along the inclined lines 23 and are stopped at tips of the inclined lines 23, thereby causing a difficulty in assembling the conventional belt type hose band.

Therefore, a worker needs to rotate the electric driver D while pressing down the rotation plate 31 using his/her fingers, thus greatly lowering workability and assembly efficiency due to complication during the assembly process as well as causing assembly defects.

It is desirable to provide a belt type clamp, which rapidly and accurately achieves a coupling operation of a band by snap connection between snap protrusions and snap depressions.

In accordance with an aspect of the present invention, a belt type clamp is provided which has a band provided with saw-toothed grooves, a body including side plates extended upward from both sides of a base receiving one end of the band to be in surface contact with the end of the band and connected with the end of the band by spot-welding, and respectively provided with inclined lines inclined to the other end of the band and inclined long holes being opposite to each other, a rotating unit including a rotary shaft extended upward from one end of a rotation plate covering an upper portion of a space between the side plates, provided with a first shaft hole formed thereon and both ends extended to both sides and respectively inserted into the inclined long holes, protrusions extended upward form the other end of the rotation plate, provided with a second shaft hole formed therebetween, and respectively fixed to the inclined lines, and stoppers extended upward from both sides of the rotation plate and respectively surrounding the side plates, and a locking bolt inserted into the first shaft hole and the second shaft hole and thus rotated at its present position, and provided with a screw thread engaged with the saw-toothed grooves of the band, including snap protrusions respectively protruded from the inner surfaces of the stoppers, and snap depressions respectively formed on the outer surfaces of the side plates to receive the snap protrusions.

BRIEF DESCRIPTION OF THE DRAWINGS

The above and other features and other advantages of the present invention will be more clearly understood from the following detailed description taken in conjunction with the accompanying drawings, in which.

DETAILED DESCRIPTION OF THE INVENTION

Now, a preferred embodiment of the present invention will be described in detail with reference to the annexed drawings.

Figure 1A:
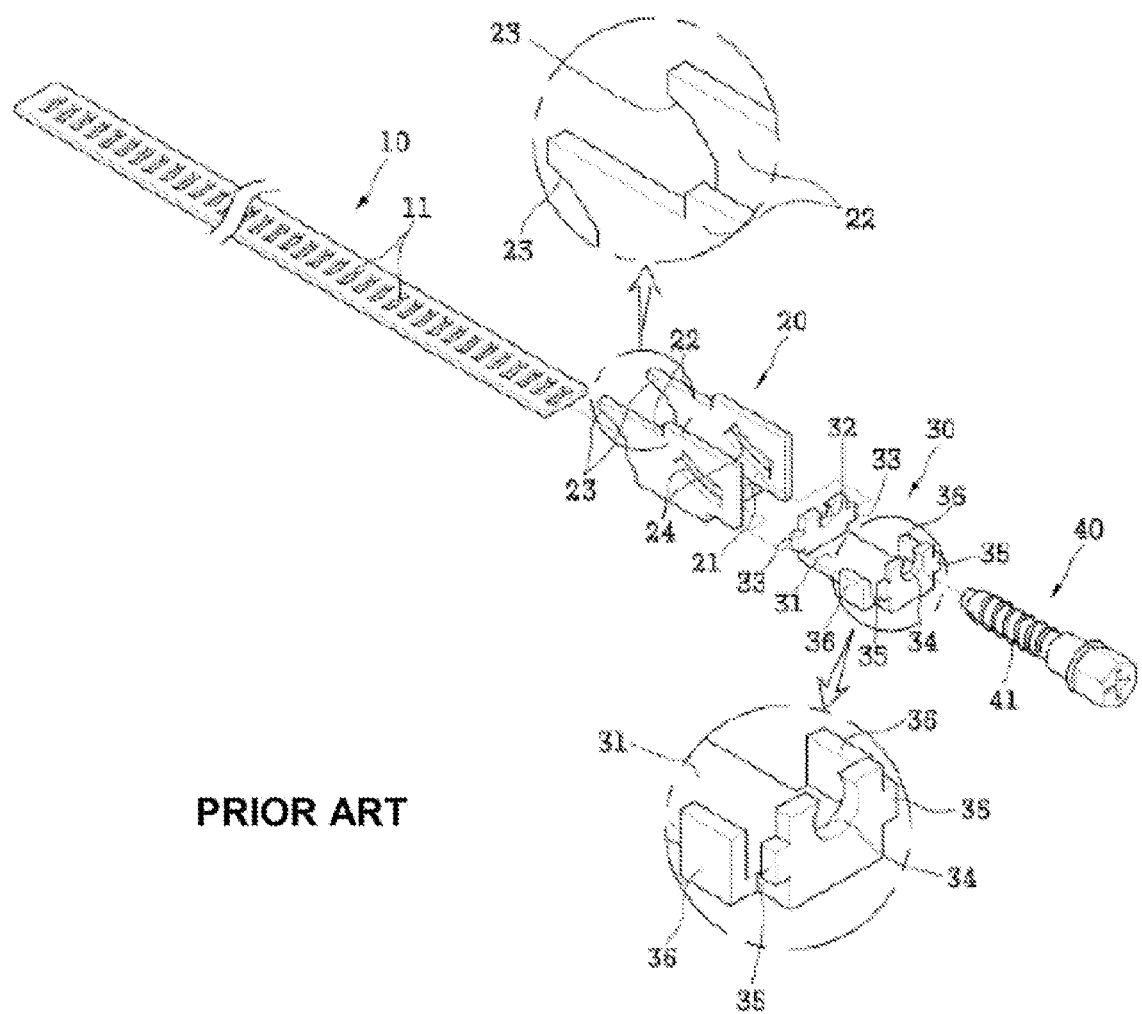
FIGS. 1a to 1c are perspective views illustrating an assembly process of a conventional belt type hose band.
Figure 1B:
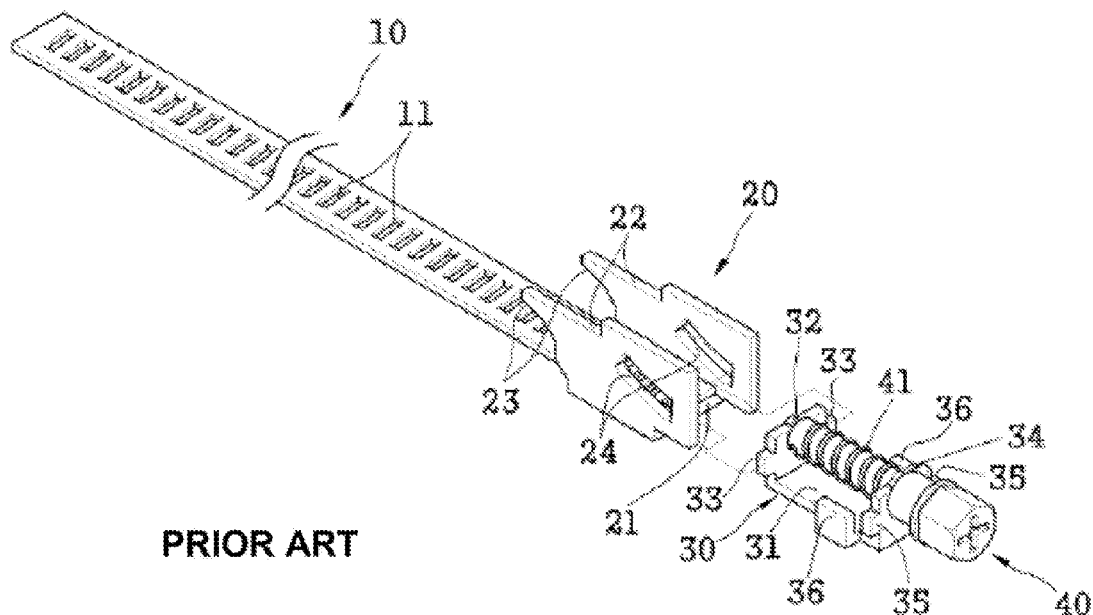
Figure 1C:
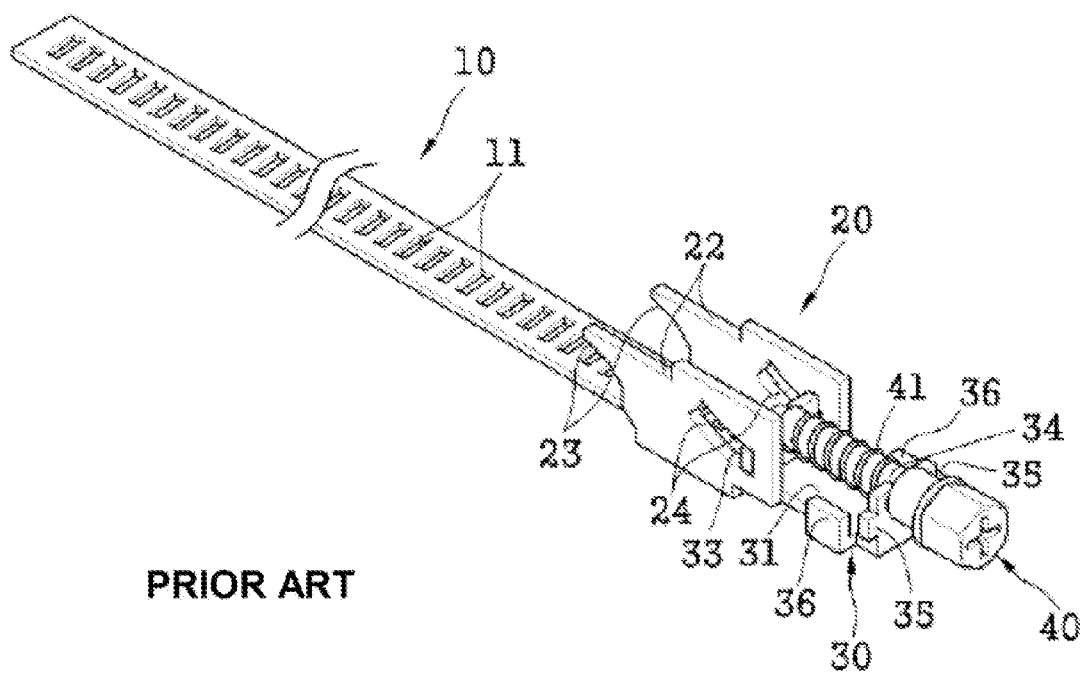
Figure 2A:
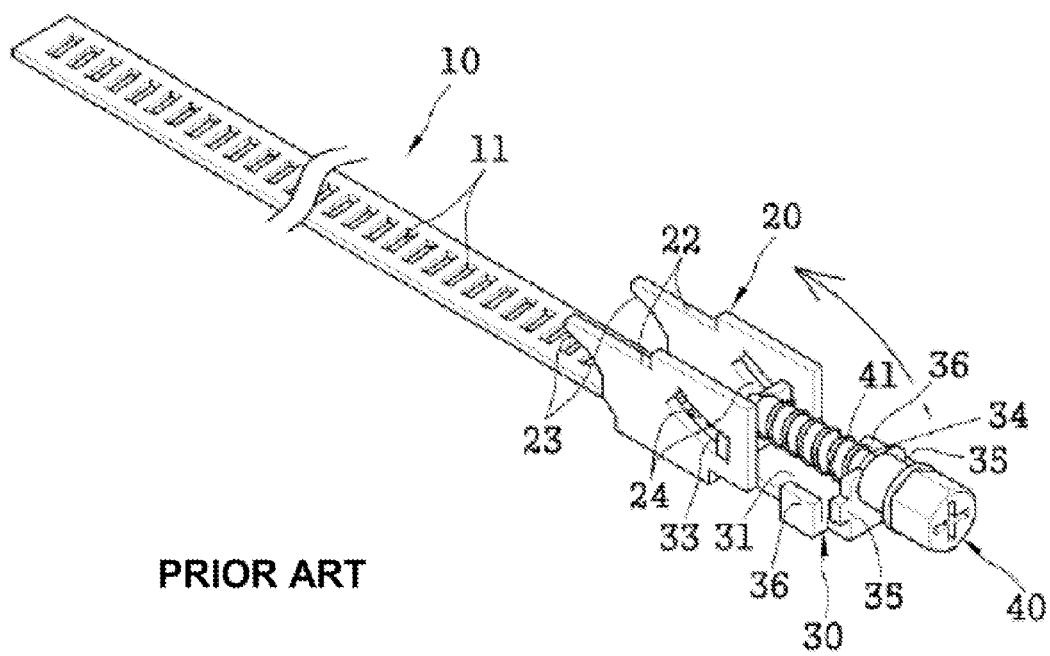
FIGS. 2a to 2d are perspective views illustrating a coupling process of the conventional belt type hose band.
Figure 2B:
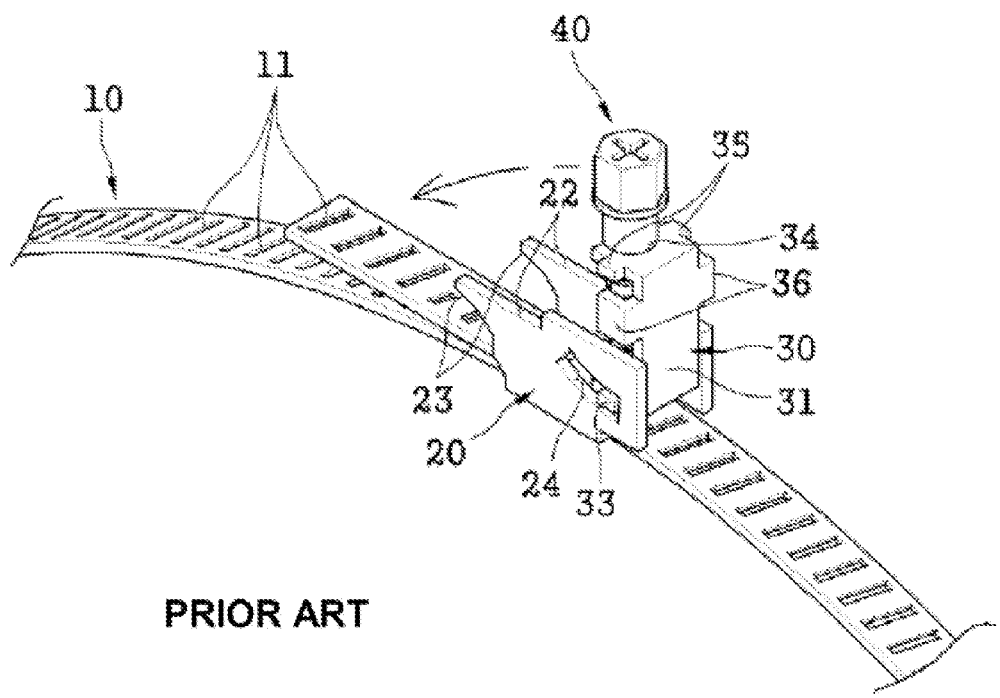
Figure 2C:
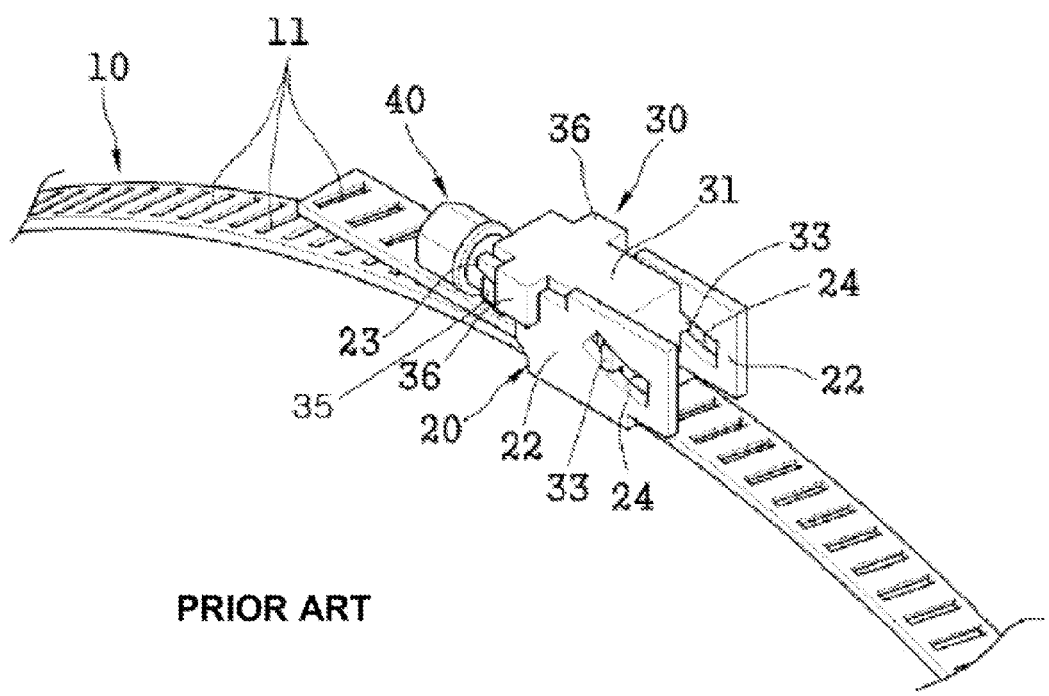
Figure 2D:
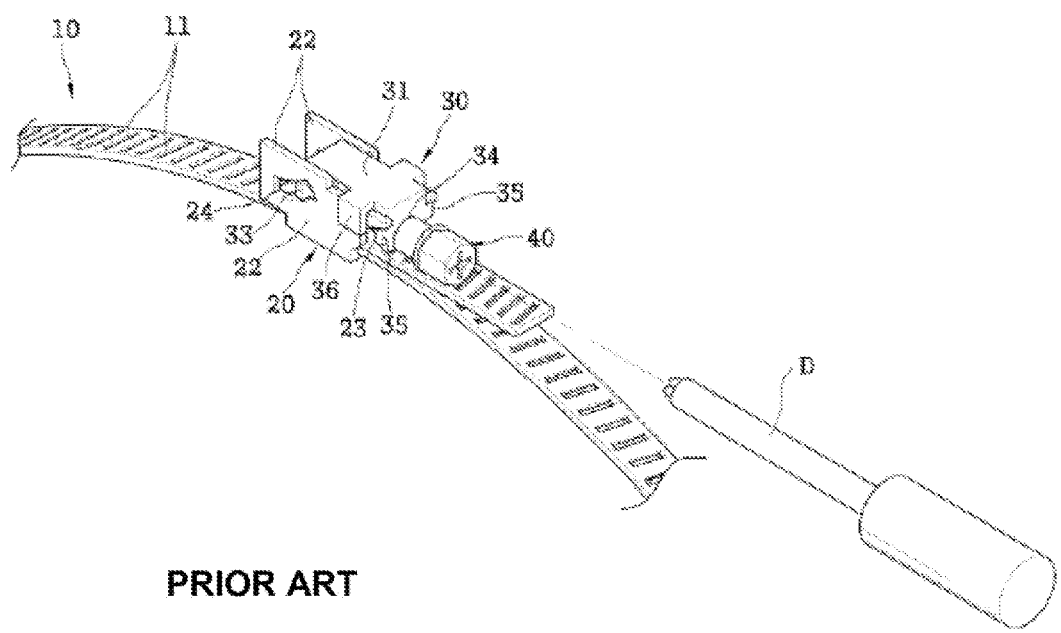
Figure 3A:
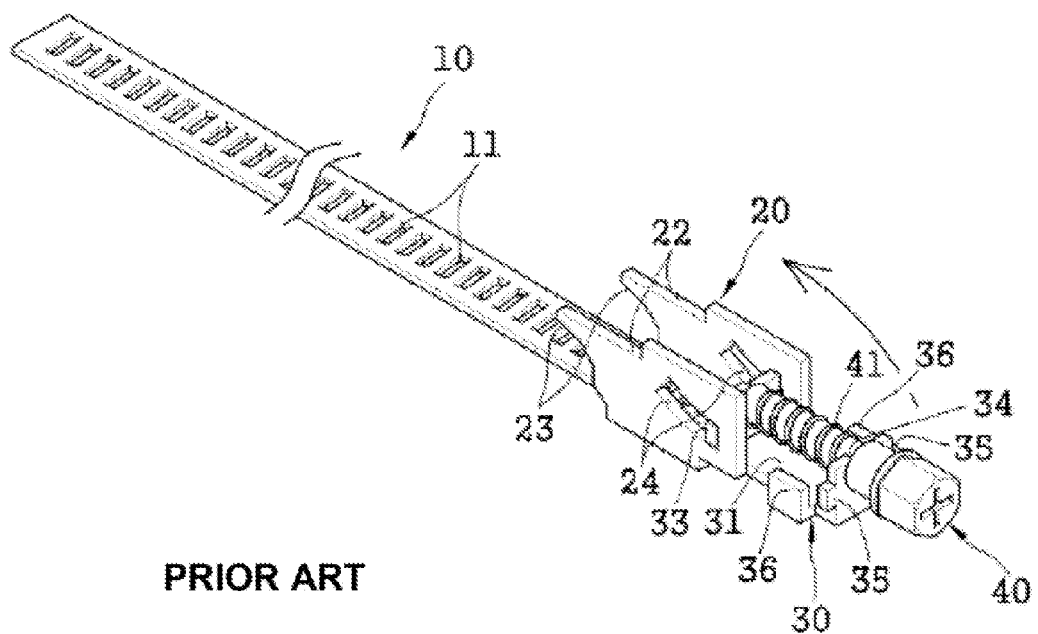
FIGS. 3a to 3c perspective views illustrating problems generated during the coupling process of the conventional belt type hose band.
Figure 3B:
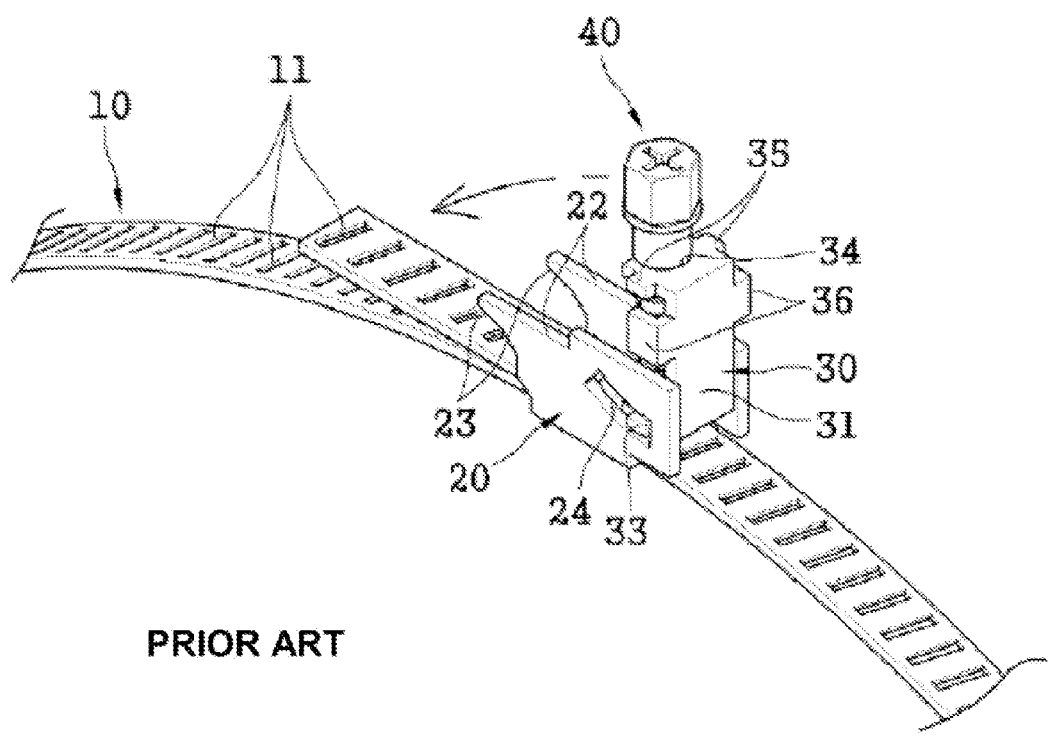
Figure 3C:
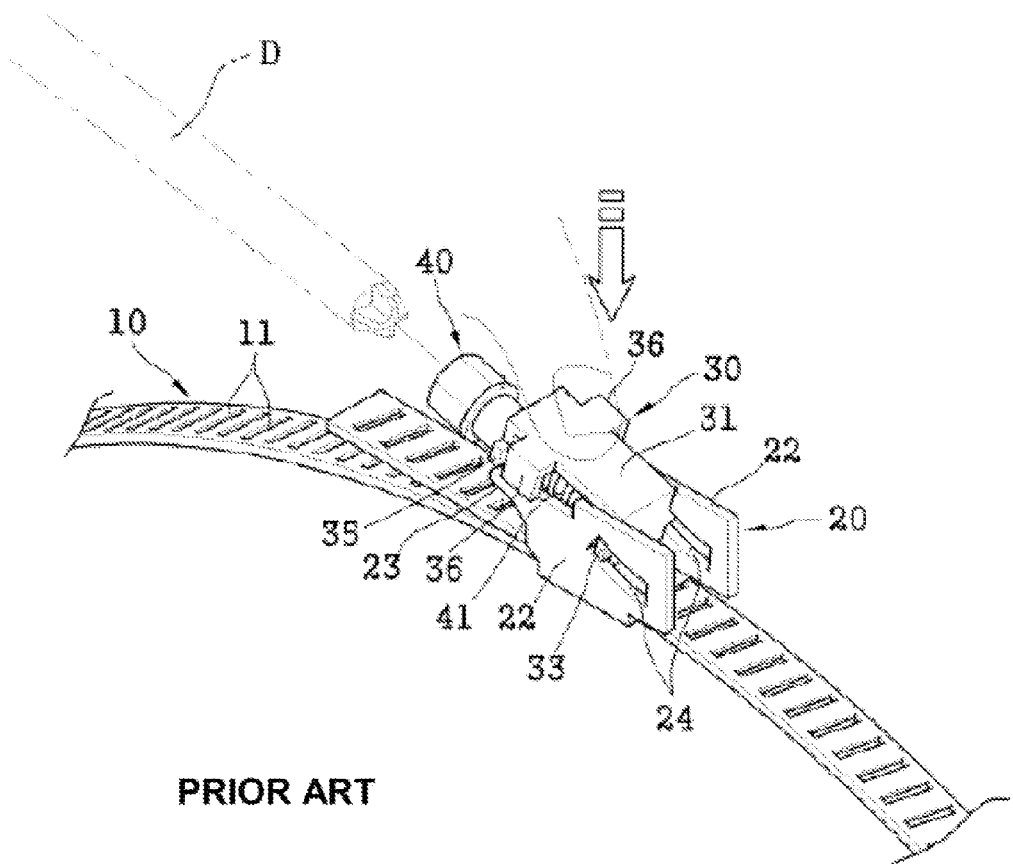
Figure 4A:
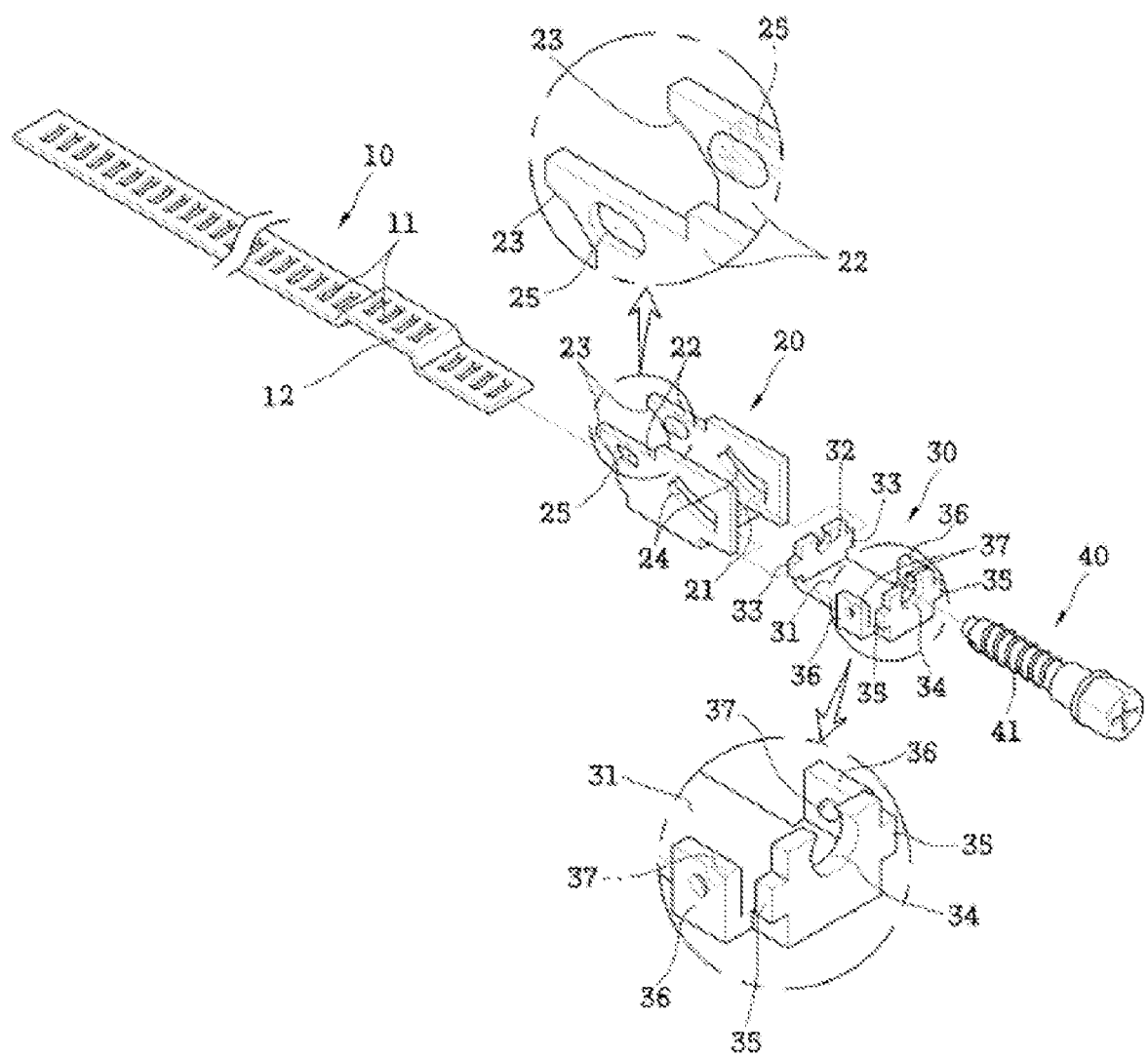
FIGS. 4a to 4c are perspective views illustrating an assembly process of a belt type clamp in accordance with an embodiment of the present invention.
Figure 4B:
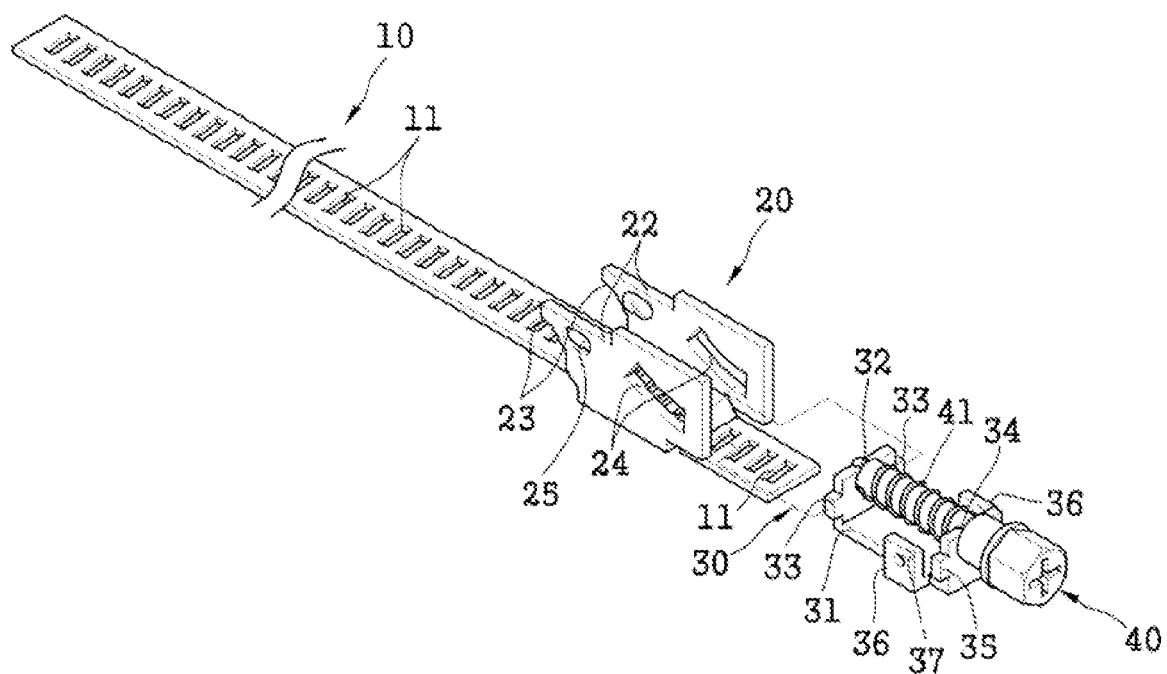
Figure 4C:
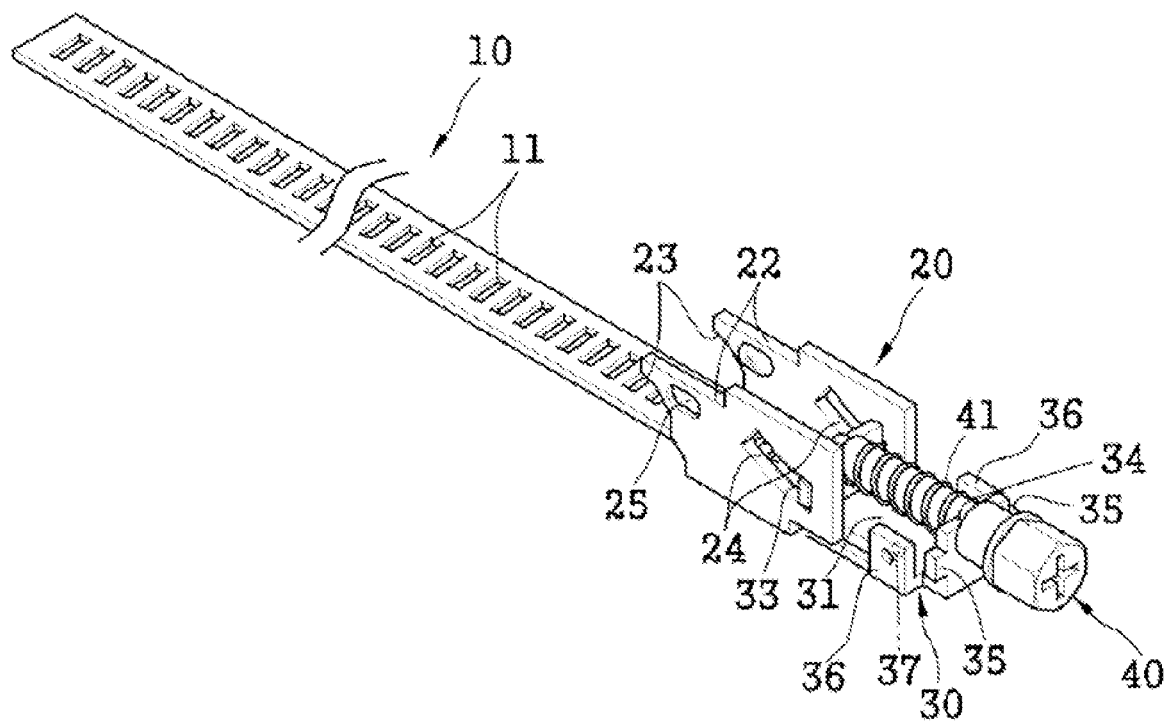

FIGS. 4a to 4c are perspective views illustrating an assembly process of a belt type clamp in accordance with an embodiment of the present invention.

The belt type clamp in accordance with the embodiment of the present invention, as shown in FIGS. 4a to 4c, includes a band 10, a body 20, a rotating unit 30, and a locking bolt 40.

The band 10 is made of stainless steel, which is incorrodible, and is provided with saw-toothed grooves 11 formed on the surface thereof.

The body 20 includes side plates 22 extended upward from, both sides of a base 21, which receives one end of the band 10 to be in surface contact with one end of the band 10 and is connected with the end of the band 10 by spot-welding, and respectively provided with inclined lines 23 inclined to the other end of the band 10 and inclined long holes 24 being opposite to each other.

The rotating unit 30 includes a rotary shaft 33 extended upward from one end of a rotation plate 31 covering an upper portion of a space between the side plates 22 of the body 20 and provided with a first shaft hole 32 formed thereon and both ends extended to both sides and respectively inserted into the inclined long holes 24, protrusions 35 extended upward form the other end of the rotation plate 31, provided with a second shaft hole 34 formed therebetween, and respectively fixed to the inclined lines 23, and stoppers 36 extended upward from both sides of the rotation plate 31 and respectively surrounding the side plates 22.

The locking bolt 40 is inserted into the first shaft hole 32 and the second shaft 34 and thus is rotated at its present position, and is provided with a screw thread 41 engaged with the saw-toothed grooves 11 of the band 10.

The belt type clamp in accordance with the embodiment of the present invention further includes snap protrusions 37 respectively protruded from the inner surfaces of the stoppers 36, and snap depressions 25 respectively formed on the outer surfaces of the side plates 22 to receive the snap protrusions 37.

Preferably, the band 10, which is in surface contact with the base 21 of the body 20, includes a bending part 12.

Now, a process of assembling the band 10, the body 20, the rotating unit 30, and the locking bolt 40 will be described with reference to FIGS. 4a to 4c. As shown in FIG. 4a to 4c, one end of the band 10 provided with the saw-toothed grooves 11 is inserted into the body 20 such that the bending part 12 of the band 10 is in contact with, the base 21 of the body 20, and then the bending part 12 of the band 10 is connected to the base 21 of the body 20 by spot-welding. Thereafter, the locking bolt 40 is inserted into the first shaft hole 32 and the second shaft hole 34 of the rotating unit 30 such that the locking bolt 40 in the first shaft hole 32 and the second shaft hole 34 is rotated at its present position, and then both ends of the rotary shaft 33 of the rotating unit 30 are inserted into the body 20, i.e., the inclined long holes 24 of the side plates 22. Thereby, the assembly of the belt type clamp is completed.

If the band 10 is horizontally connected to the base 21 of the body 20 by spot-welding in the conventional belt type hose band, the base 21 and the band 10 may be separated from each other during a process of drawing the band 10 by rotation of the locking bolt 40. However, if the bending part 12 of the band 10 is seated on the base 21 and then is connected to the base 21 of the body 20 by spot-welding in the belt type clamp in accordance with this embodiment, although the band 10 is drawn using the locking bolt 40, the separation of the base 21 and the bending part 12 from each other is minimized.

Hereinafter, a coupling process of the belt type clamp in accordance with the embodiment of the present invention will be described with reference to FIGS. 5a to 5d.

FIGS. 5a to 5d are perspective views illustrating the coupling process of the belt type clamp in accordance with the embodiment of the present invention.

Figure 5A:
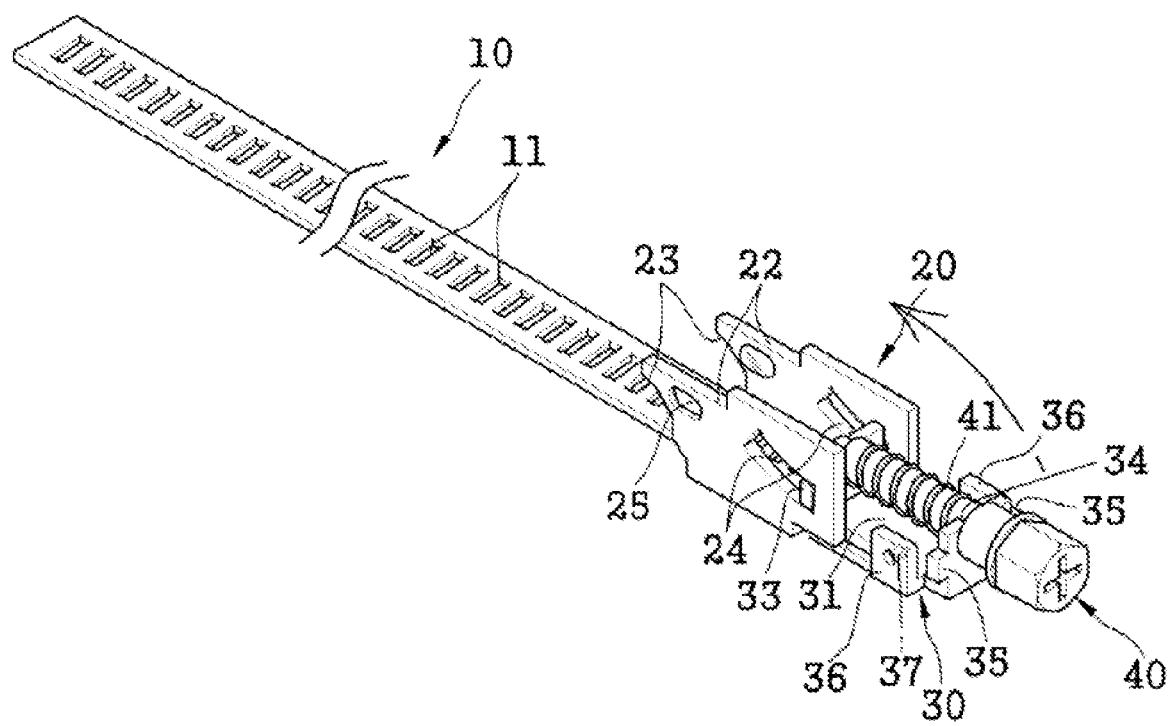
FIGS. 5a to 5d are perspective views illustrating a coupling process of the belt type clamp in accordance with the embodiment of the present invention.
Figure 5B:
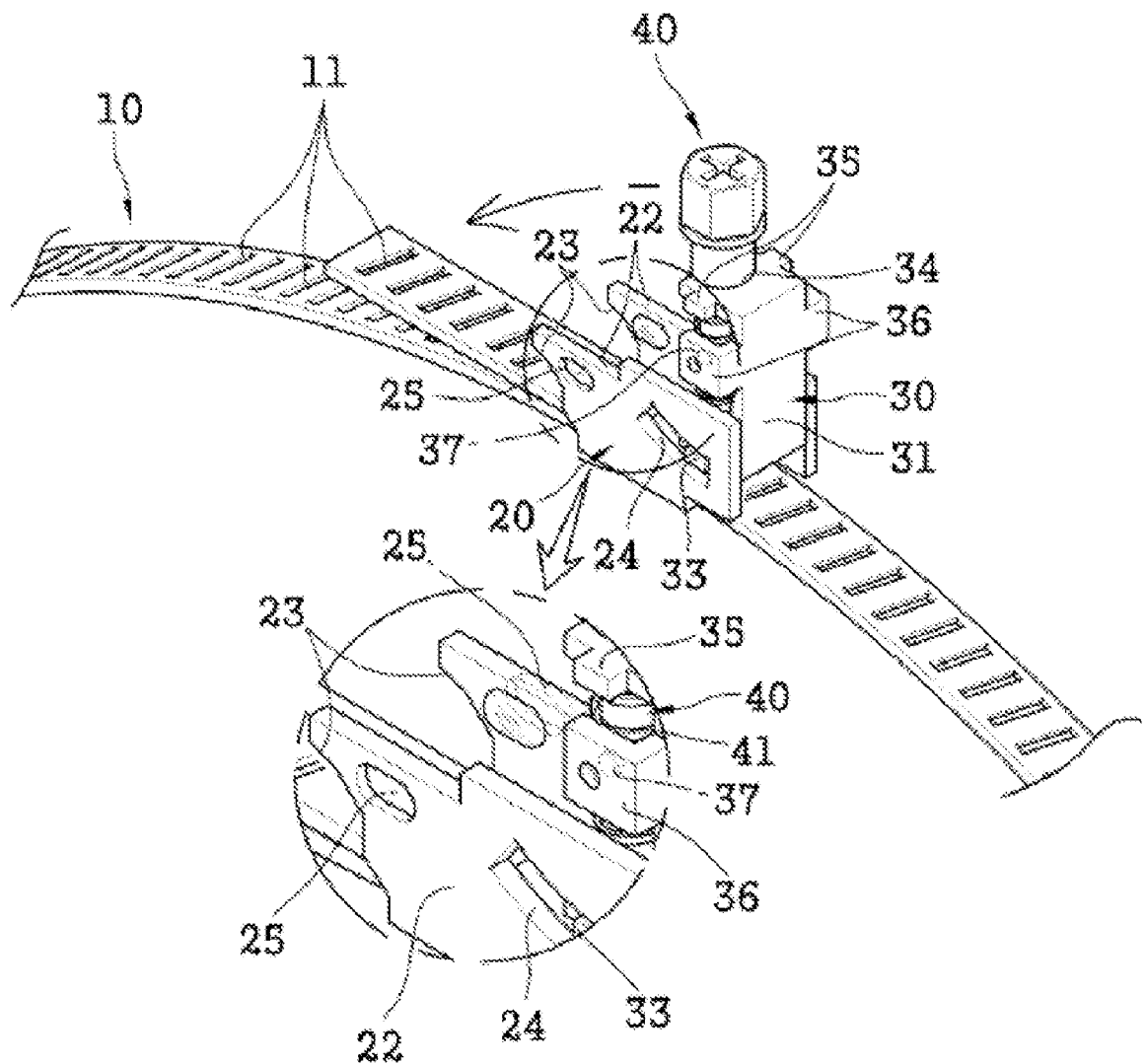

Under the condition that both ends of the rotary shaft 33 of the rotating unit 30 are inserted into the inclined long holes 24 of the body 20, as shown in FIG. 5a, the rotating unit 30 with the locking bolt 40 is erected at an angle of 90° so as to secure a gap between the rotation plate 31 and one end of the band 10, as shown in FIG. 5b. Thereafter, the other end of the band 10 encircles, for example, outer circumferential surfaces of ducts (not shown), and then is inserted into the gap between the rotation plate 31 and the end of the band 10.

Figure 5C:
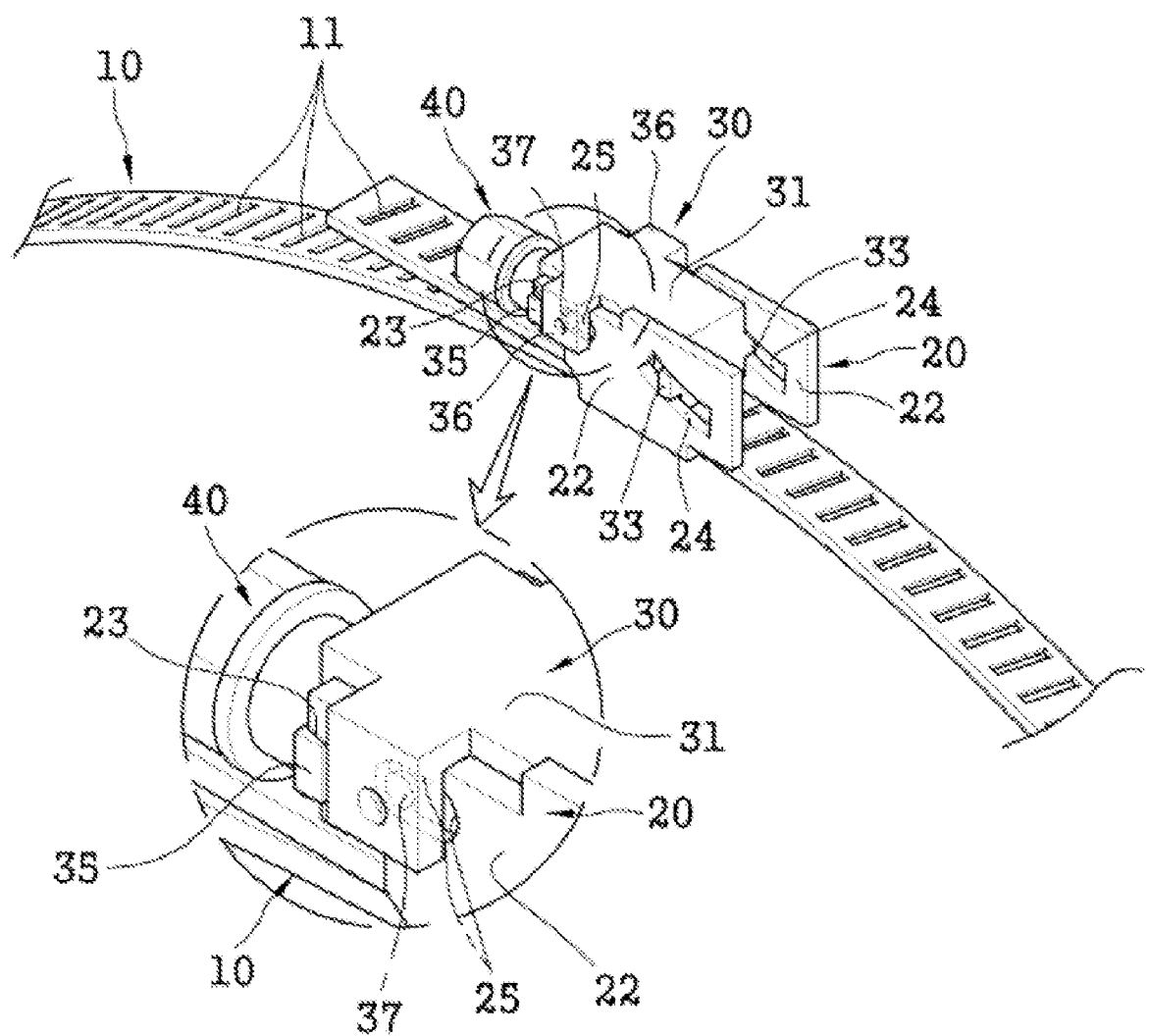

Thereafter, as shown in FIG. 5c, the rotating unit 30, into which the locking bolt 40 is inserted, is further rotated, i.e., is rotated by an angle of 180° about the rotary shaft 33, thereby engaging the screw thread 41 of the locking bolt 40 with the saw-toothed grooves 11 of the band 10 and connecting the snap protrusions 37 of the stoppers 36 with the snap depressions 25 of the body 20 with a snap.

The pressing pressure of the rotation plate 31 is maintained, as it is, by snap connection of the snap protrusions 37 of the stoppers 36 with the body 20, i.e., the snap depressions 25 of the side plates 22. Therefore, even if a force of spreading the band 10 due to the elasticity of the band 10 made of stainless steel occurs, the screw thread 41 of the locking bolt 40 is still fixed to the saw-toothed grooves 11 of the band 10, and thus maintains engagement with the saw-toothed grooves 11.

Figure 5D:
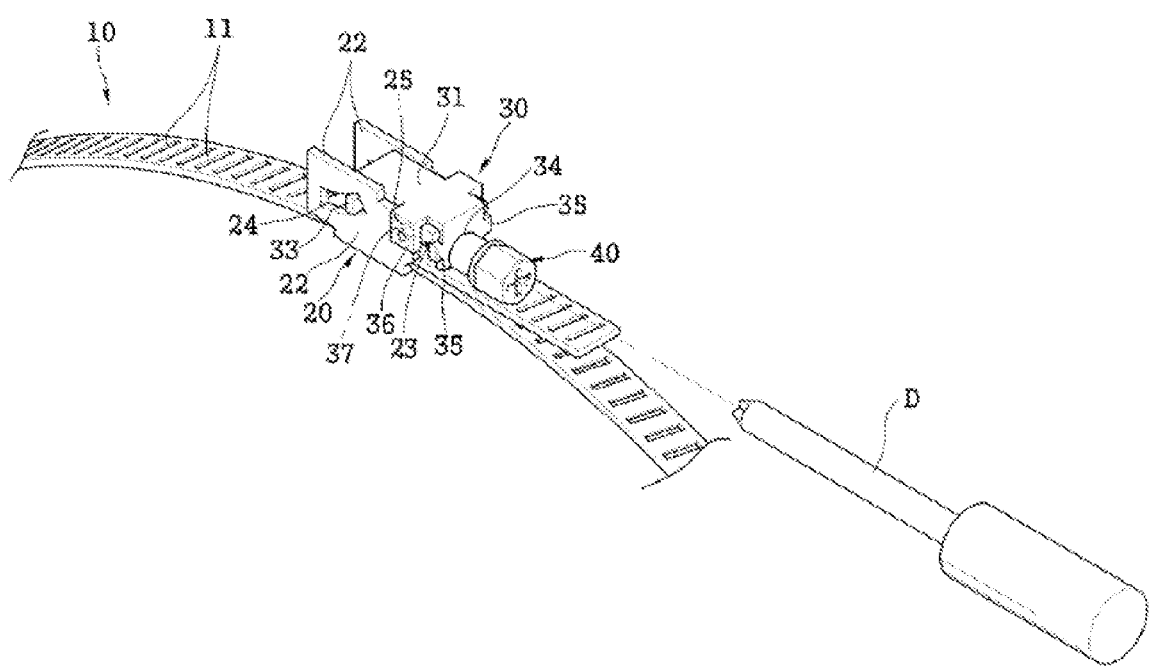

Thereafter, as shown in FIG. 5d, the locking bolt 40 is rotated at its present position by a driver (electric driver) D such that the screw thread 41 is engaged with the saw-toothed grooves 11, thereby drawing the other end of the band 10 to the end of the band 10 and thus effectively tightening the ducts.

During the process of drawing the other end of the band 10 to the end of the band 10, the protrusions 35 of the rotating unit 30 slide along the inclined lines 23 of the body 20 and thus the screw thread 41 of the locking bolt 40 located between the body 20 and the rotation plate 31 is fixed to the saw-toothed grooves 11 of the band 10, thereby rapidly and accurately achieving the assembly of the band 10, the body 20, the rotating unit 30, and the locking bolt 40.

More concretely, the screw thread 41 of the locking bolt 40 is engaged with the saw-toothed grooves 11 of the band 10 and the snap connection between the snap protrusions 37 of the stoppers 36 and the snap depressions 25 of the body 20 is achieved by rotating the rotating unit 30, into which the locking bolt 40 is inserted, by an angle of 180°, thereby being capable of maintaining the pressing pressure of the rotation plate 31, as it is. Therefore, although the force of spreading the band 10 due to the elasticity of the band 10 occurs, the screw thread 41 of the locking bolt 40 is still engaged with the saw-toothed grooves 11 of the band 10. Accordingly, when the locking bolt 40 is rotated by the electric driver D, smooth rotation of the locking bolt 40 is possible, the ducts are effectively tightened by drawing the other end of the band 10 while engaging the screw thread 41 with the saw-toothed grooves 11, the protrusions 35 of the rotating unit 30 are not stopped at the tips of the inclined lines 23 of the body 20 but smoothly slide along the inclined lines 23. Thereby, the screw thread 41 of the locking bolt 40 located between the body 20 and the rotation plate 31 is more closely fixed to the saw-toothed grooves 11 formed on the band 10, thus rapidly and accurately achieving the assembly of the band 10, the body 20, the rotating unit 30, and the locking bolt 40.

Preferably, the snap protrusions 37 are formed in a hemispherical shape, and the snap depressions 25 are formed in an oval shape.

In case that the snap protrusions 37 are formed in a hemispherical shape, when the rotation plate 31 is pressed toward the body 20, the hemispherical surfaces of the snap protrusions 37 are easily seated along the snap depressions 25, and when the rotation plate 31 is separated from the body 20, the hemispherical surfaces of the snap protrusions 37 are easily separated from the snap depressions 25. Further, in case that the snap depressions 25 are formed in an oval shape, the snap protrusions 37 maintain a clearance state with the snap depressions 25 along the oval snap depressions 25 in the same manner that both ends of the rotary shaft 33 move from the upper limit to the lower limit along the inclined long holes 24.

As apparent from the above description, the belt type clamp in accordance with the embodiment of the present invention rapidly achieves a coupling operation of the band by snap connection between the snap protrusions and the snap depressions, thereby preventing assembly defects and maximizing assembly efficiency and workability.

The screw thread of the locking bolt is engaged with the saw-toothed grooves of the band and the snap connection between the snap protrusions of the stoppers and the snap depressions of the body is achieved by rotating the rotating unit, into which the locking bolt is inserted, thereby being capable of maintaining the pressing pressure of the rotation plate, as it is. Therefore, although a force of spreading the band due to the elasticity of the band occurs, the screw thread of the locking bolt is still engaged with the saw-toothed grooves of the band. Accordingly, when the locking bolt is rotated by an electric driver, smooth rotation of the locking bolt is possible, ducts are effectively tightened by drawing the other end of the band while engaging the screw thread with the saw-toothed grooves, the protrusions of the rotating unit are not stopped at the tips of the inclined lines of the body but smoothly slide along the inclined lines. Thereby, the screw thread of the locking bolt located between the body and the rotation plate is more closely fixed to the saw-toothed grooves formed on the band, thus rapidly and accurately achieving the assembly of the band, the body, the rotating unit, and the locking bolt.

Further, the snap protrusions are formed in a hemispherical shape, and thus when the rotation plate is pressed toward the body, the hemispherical surfaces of the snap protrusions are easily seated along the snap depressions, and when the rotation plate is separated from the body, the hemispherical surfaces of the snap protrusions are easily separated from the snap depressions.

Further, the snap depressions are formed in an oval shape, and thus the snap protrusions maintain a clearance state with the snap depressions along the oval snap depressions in the same manner that both ends of the rotary shaft move along the inclined long holes.

Moreover, since the bending part of the band is seated on the base and is connected to the base by spot-welding, although the band is drawn using the locking bolt, the spot-welded state between the base and the bending part is firmly maintained, and thus the separation of the base and the bending part from each other is minimized.

The present invention may be applied to the field of a belt type clamp used in ducts or hoses.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A belt type clamp, which has a band provided with saw-toothed grooves, a body including side plates extended upward from both sides of a base receiving one end of the band to be in surface contact with the end of the band and connected with the end of the band by spot-welding, and respectively provided with inclined lines inclined to the other end of the band and inclined long holes being opposite to each other, a rotating unit including a rotary shaft extended upward from one end of a rotation plate covering an upper portion of a space between the side plates, provided with a first shaft hole formed thereon and both ends extended to both sides and respectively inserted into the inclined long holes, protrusions extended upward form the other end of the rotation plate, provided with a second shaft hole formed therebetween, and respectively fixed to the inclined lines, and stoppers extended upward from both sides of the rotation plate and respectively surrounding the side plates, and a locking bolt inserted into the first shaft hole and the second shaft hole and thus rotated at its present position, and provided with a screw thread engaged with the saw-toothed grooves of the band, comprising:

snap protrusions respectively protruded from the inner surfaces of the stoppers; and snap depressions respectively formed on the outer surfaces of the side plates to receive the snap protrusions.

2. The belt type clamp according to claim 1, wherein:

the snap protrusions are formed in a hemispherical shape; and the snap depressions are formed in an oval shape.

3. The belt type clamp according to claim 2, wherein the band being in surface contact with the base of the body includes a bending part.

4. The belt type clamp according to claim 1, wherein the band being in surface contact with the base of the body includes a bending part.

* * * * *